Oct. 6, 1959 L. A. VOELL 2,907,827

TELEPHONE DEVICE

Filed July 22, 1955

3 Sheets-Sheet 1

Inventor
Louis A. Voell
By Schroeder, Hofgren, Brady & Wegner
Attorneys

Oct. 6, 1959 L. A. VOELL 2,907,827

TELEPHONE DEVICE

Filed July 22, 1955 3 Sheets-Sheet 2

Inventor
Louis A. Voell
By Schroeder, Hofgren, Brady & Wagner
Attorneys

Inventor
Louis A. Voell
By
Schroeder, Hofgren, Brady & Wegner
Attorneys 2,907,827

TELEPHONE DEVICE

Louis A. Voell, Fond du Lac, Wis., assignor of one-half to Sheridan Gallagher

Application July 22, 1955, Serial No. 523,775

6 Claims. (Cl. 179—1)

This invention relates to a telephone device and in particular to a device allowing remote utilization of a standard telephone.

It is often desirable to extend the range of usefulness of a standard telephone by allowing the party using the telephone to be at some remote point therefrom. Illustratively, such use would be desirable by an invalid who is unable to effect even the relatively simple operations attendant the normal telephone usage, or by a person such as a business executive allowing concurrent use of the executive's hands while carrying on a telephone conversation, or by a conference or group of persons where all desire to hear the received communication and any member thereof may desire to converse with the party or parties at the other end of the telephone line. It is desirable further to provide means for effecting such a remote utilization of the telephone without making permanent mechanical or electrical connections to the telephone so that it may be used in the ordinary manner whenever desired.

While certain devices are known in the art which effect remote utilization of a telephone, these have certain serious disadvantages in that they require either a permanent connection to or modification of the standard telephone, or require many of the steps required in the normal use of the telephone such as manually removing and replacing the telephone handset and the placement of the handset in a suitable sound amplifying device. Further, such devices often permit feed back between the sending and receiving circuits of the telephone so that howling and similar undesirable effects are produced.

The principal feature of this invention is the provision of a new and improved device for remote use of the standard telephone.

Another feature is the provision of such a device wherein the telephone is removably carried and no electrical or fixed mechanical connection between the device and the telephone is required.

A further feature of the invention is the provision of a device permitting the remote use of a telephone, having means for amplifying sound transmitted to and from the telephone, and means for moving the handset of the telephone alternatively into a connected and a disconnected position, with unitary means operably associated with each of the amplifier and the moving means for concurrent operation thereof.

A further feature is the provision of a device allowing remote use of a telephone having one amplifier for amplifying sound transmitted from the telephone, and a second amplifier for amplifying sound transmitted to the telephone, and with means for preventing effectively feed back between the receiving and transmitting circuits of the telephone.

A yet further feature is the provision of a device permitting the remote use of a telephone having solenoid means which may be energized from a remote point relative to the telephone.

Yet another feature of the invention is the provision of a device for use with a telephone having new and improved means for permitting the recording of sound transmitted to and from the telephone by a suitable recording means.

Other features and advantages of this invention will be apparent from the following description taken in connection with the accompanying drawings, wherein.

Figures 1, 2, 3:
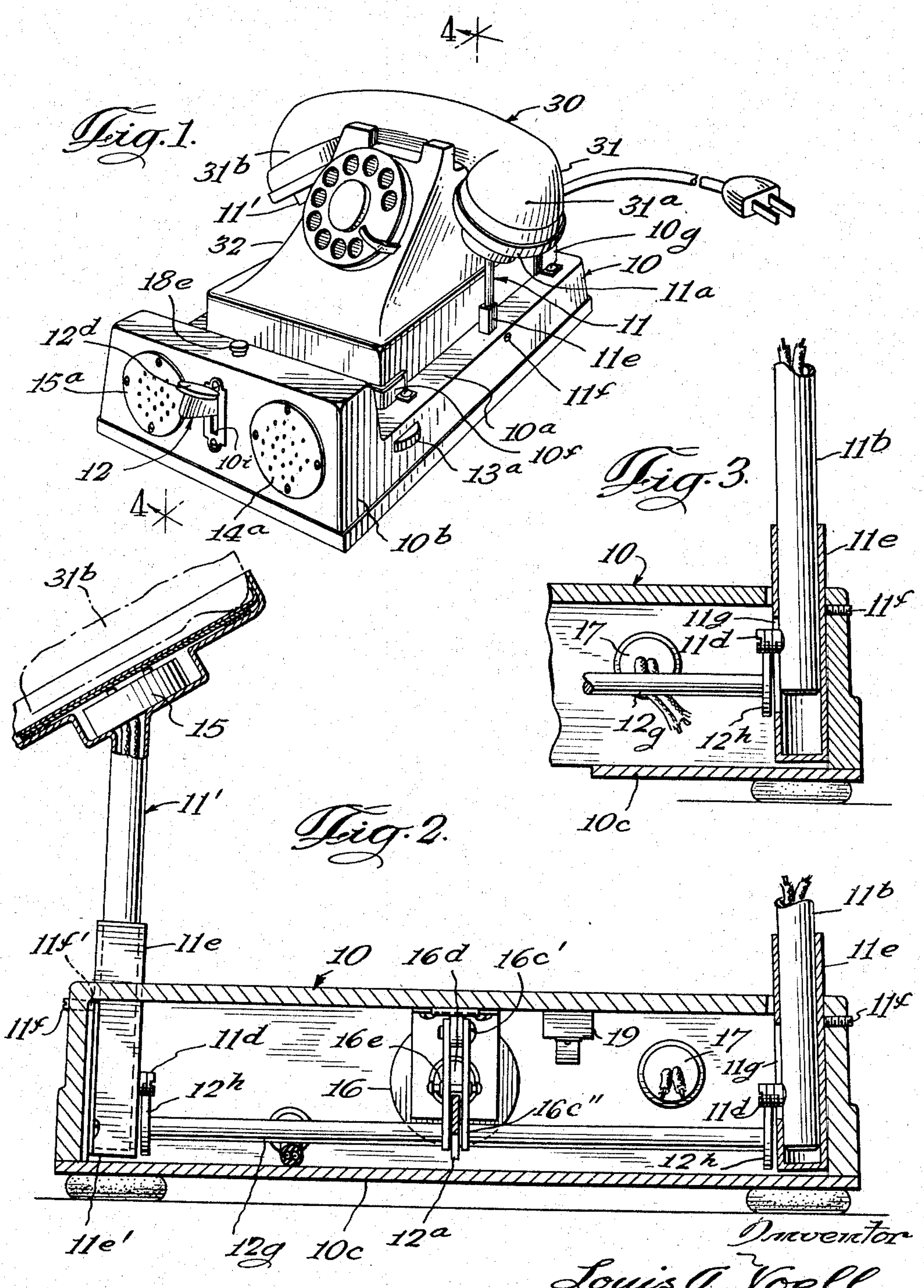
Figure 1 is a perspective view of a device embodying the invention with a telephone in place thereon.
Figure 2 is an enlarged fragmentary sectional view of the device taken approximately along the line 2—2 of Figure 4.
Figure 3 is a fragmentary sectional view of the device with parts thereof in a different position from the position of Figure 2.

In the exemplary embodiment of the invention as disclosed in the drawings, the device is seen to comprise a generally flat, hollow support 10 having a bed portion 10*a* which is adapted to carry a standard handset type telephone, generally designated 30, of a type well known in the art. Means for mechanically raising the handset 31 relative to the base 32 of the telephone 30 are provided comprising a pair of carrier members 11 and 11' which are arranged to extend upwardly from the bed portion 10*a* on opposite sides of the telephone base 32. Extending through and projecting outwardly from the front 10*b* of support 10 is a lever mechanism 12 which is operably associated with the carrier members 11 and 11' for manipulation thereof to raise or lower the handset 31 to make telephone 30 operative or inoperative as desired.

To permit remote utilization of telephone 30 two amplifiers 13 and 13' are provided, being carried within support 10. A microphone 14, illustratively shown as mounted in carrier member 11, is provided for transmitting sound from receiver or ear phone 31*a* of telephone handset 31 to amplifier 13. A speaker 15, illustratively shown as mounted in carrier member 11', is provided to transmit sound from amplifier 13' to mouthpiece or transmitter 31*b* of telephone handset 31. A speaker 14*a* is mounted in support front 10*b* for projection therefrom of sound received from earphone 31*a* and amplified by amplifier 13. A microphone 15*a* is also carried by support front 10*b* for transmitting sound to amplifier 13' to be transmitted through speaker 15 to telephone mouthpiece 31*b*.

To permit remote operation of lever mechanism 12 and utilization of telephone 30, a solenoid 16 is provided which is mounted within support 10 and which is actuated by a switch 16*a* through suitable wiring 16*b*. Switch 16*a* may be of a simple push button type as shown in the drawings, or of a suitable automatic type such as one responsive to the ringing of telephone 30 for automatically operating the device to place the telephone in a connected or operative condition. Jack means 17 permitting the interconnection of suitable recording devices with either or both of amplifiers 13 and 13' are also provided.

Support 10 is preferably formed of a cast material, such as metal or plastic. A bottom plate 10*c* is removably secured by screws 10*d* thereto for permitting access to the elements contained within support 10 when desired. Support 10 is enlarged upwardly at the front end 10*e* to accommodate microphone 15*a* and speaker 14*a* and a latch 18 which is used to maintain lever mechanism 12 in one position. Secured to support bed 10a by suitable screws 10f' is a front bracket 10f which cooperates with a rear bracket 10g, similarly secured to bed 10a by screws 10g', to retain removably the telephone 30 in place on the support bed 10a. Where the telephone to be mounted on the device is one having an elongated base (such as one having push buttons carried in the front part thereof) front bracket 10f may be removed by withdrawing screws 10f' and a suitable bracket means for preventing lateral movement of the telephone substituted. The spacing between bracket 10g and enlarged end 10e is made equal to the length of the elongated base so that it is retained therebetween against longitudinal movement. To prevent marring of the surface of the telephone 30, the brackets are provided with a soft material such as felt pad 10h on their telephone abutting surfaces.

As carrier members 11 and 11' are complementarily similar, the following description will be limited to member 11 only, it being understood that member 11' is similarly comprised. Carrier 11 includes a cup-shaped member 11a secured to one end of a tubular stem 11b. Cup member 11a is centrally recessed at 11h to receive microphone 14; in carrier member 11' cup member 11a receives speaker 15. A fabric pad 11c is extended interiorly of cup member 11a so that when the handset 31 is resting thereon, sound is sealingly conducted therebetween. If desired, microphone 14 and speaker 15 may be mounted in support 10 with sound being mechanically transmitted through the stems 11b respectively thereto and therefrom. At the lower end of stem 11b is provided a radially outwardly extending stop 11d which is engaged by lever mechanism 12 to effect relative vertical positioning of the carrier member. An elongated tubular socket 11e is secured at its lower end 11a' to support 10 and is adapted to slidably receive the lower end of stem 11b. To vary the angular position of stem 11b, an adjustment screw 11f is provided extending through support 10 and with its inner end 11f' bearing against socket 11e to effect a pivoting about lower end 11e' and align accurately the carrier member with the handset 31.

Figure 4:
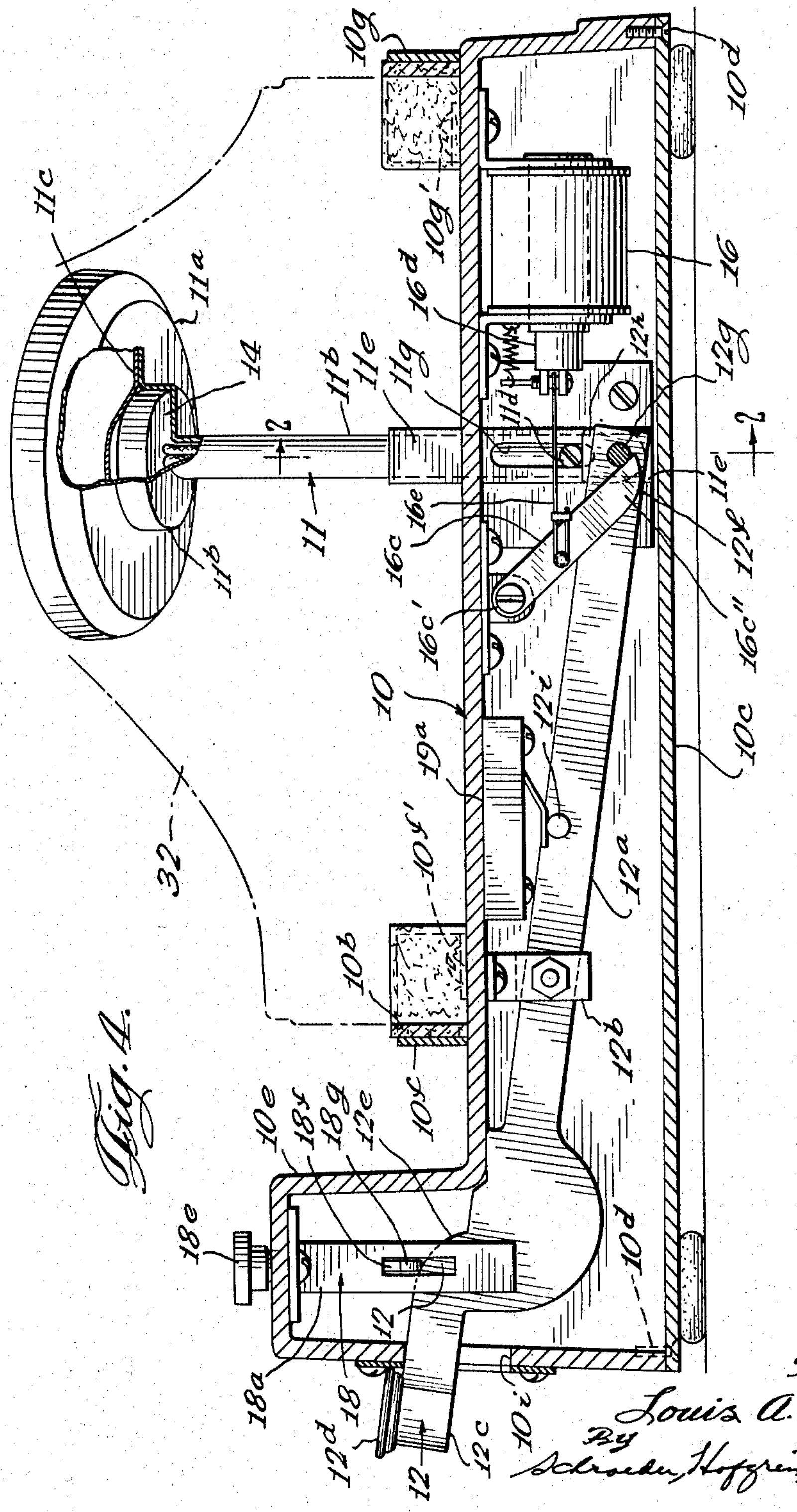
Figure 4 is a sectional view of the device, taken approximately along the line 4—4 of Figure 1.

Lever mechanism 12 includes a lever arm 12a pivotally centrally mounted on a bracket 12b which is fixedly secured to support bed 10a. An outer end 12c of lever arm 12a projects outwardly from support front 10b through an opening 10i provided therein and a suitable button 12d is secured thereto to allow manual operation of the mechanism 12. A rounded portion 12e is provided on lever arm 12a interiorly of enlarged support end 10e and is adapted to cooperate with latch 18 for securing the lever mechanism in the downward position of button 12d. A cross bar 12g is fixedly secured to the inner end 12f of lever arm 12a. At each of the ends of cross bar 12g is provided a contacting disk 12h which is adapted to bear upwardly against stops 11d of the carrier members. As best seen in Figure 4, when button 12d is moved downwardly, inner end 12f of lever arm 12a is moved upwardly and thus acts against stops 11d to move the stems 11b and cup members 11a of the carrier members upwardly so as to raise the handset 31 from the telephone base 32 and place the telephone in a connected or operative condition.

Figures 5, 6, 7:
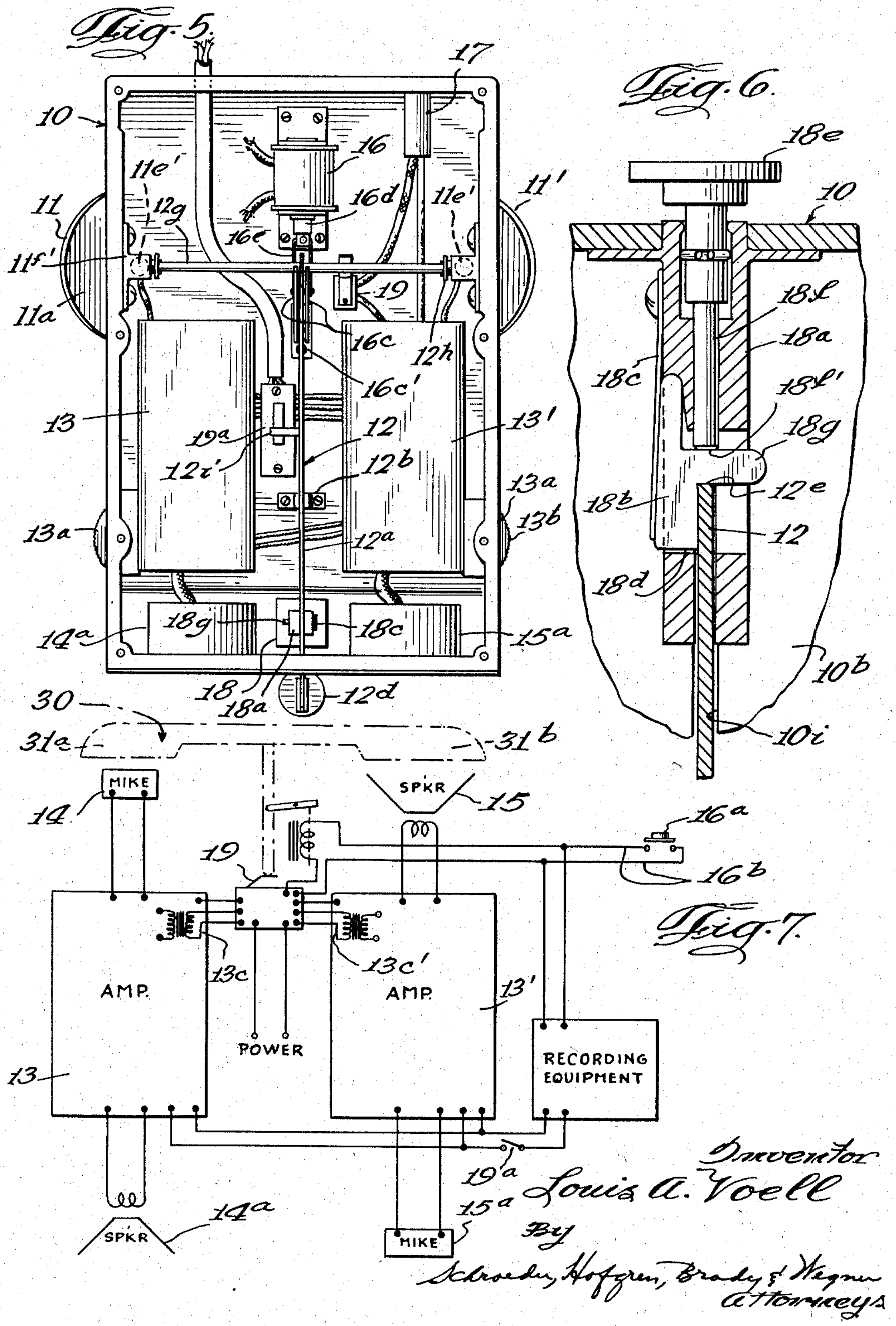
Figure 5 is a reduced bottom plan view of the device.
Figure 6 is an enlarged fragmentary view of the latch mechanism of the device.
Figure 7 is a schematic representation of the electrical circuits of the device and associated equipment.

As indicated above, when lever outer end 12c is in its lower position, latch 18 acts to hold it there. As best seen in Figure 6, latch 18 includes a tubular body 18a which is fixedly secured to support 10 and which extends into enlarge end 10e. A catch 18b is pivotally retained within body 18a by leaf spring 18c. When the outer end 12c of the lever arm is moved downwardly to a point where rounded portion 12e thereof is disposed below lower surface 18d of catch 18b, spring 18c urges the catch inwardly (to the right as seen in Figure 6) so as to prevent an upward return of the arm end 12c. A release button 18e is provided having a rod 18f slidably retained within latch body 18a. The inner end 18f' of rod 18f is arranged to bear against a lateral projection 18g of catch 18b so that downward movement of rod 18f pivots catch 18b in a clockwise direction, as seen in Figure 6, thereby removing surface 18d from the return path of lever arm 12a and allowing the arm to return to the position where outer end 12c is at its upper limit. It should be obvious to one skilled in the art that catch 18b may be pivoted by a suitable, remotely controllable means such as a solenoid in lieu of or in addition to button 18e.

In lieu of manually depressing button 12d, lever arm 12a may be operated by means of solenoid 16 which is mounted on support bed 10a adjacent lever inner end 12f. A bar 16c is pivotally secured at one end 16c' to support bed 10a with its free end 16c'' disposed to abut the underside of cross bar 12g. The plunger 16d of solenoid 16 is mechanically connected to the bar 16c intermediate its ends by suitable means such as wires 16e, so that whenever the solenoid is energized, the plunger is drawn inwardly (to the right as seen in Figure 4) to pivot bar 16c and urge cross bar 12g upwardly. As the cross bar is secured to the lever 12a, lever inner end 12f is moved upwardly and lever outer end 12c is moved downwardly thereby allowing latch 18 to function and retain the lever mechanism in that position. Thus, only a momentary energizing of the solenoid 16 is required to maintain the device in the telephone connected condition.

Amplifiers 13 and 13' may be of any suitable type and are provided with volume controls 13a having peripheral knurled edges 13b projecting outwardly from support 10 for manual operation thereof. Each amplifier 13 and 13' is provided with its own power supply transformer 13c and 13c' respectively, to isolate the amplifiers electrically and prevent effectively feedback. A switch 19 is provided to be actuated by the upward movement of cross bar 12g to connect the amplifiers through their respective transformers to a source of power (not shown). Thus, the amplifiers are connected automatically whenever the telephone 30 is placed in the connected or operative condition and disconnected automatically when the telephone 30 is placed in the disconnected or inoperative condition. Switch 18 may be arranged further to open the circuit to the solenoid 16 whenever the cross bar 12g is at the upper limit of its travel thereby automatically causing the energization of the solenoid to be momentary. Additional switches may be provided as desired, such as switch 19a which is illustratively shown as secured to support bed 10a and actuated by a pin 12i carried by lever arm 12a. Such a switch, for example, could be used as part of means 17 for connecting a recording device to the amplifiers. Switches similar to either switches 19 or 19a may be added for establishing other circuits such as for lighting a light at the office door to show that the user is on the telephone, opening circuits to noisy devices so that relative quiet may be had during use of the telephone, anti-robbery devices, such as door locking mechanisms, etc. Such correlative functions may thus be obtained without fixed mechanical or electrical connections to the telephone, simply by arranging them to be actuated by the lever mechanism 12, as desired.

In using my device, a standard headset type telephone 30 is simply placed on support bed 10a between front bracket 10f and rear bracket 10g and with the headset 31 resting on the carrier members 11 and 11'. To assure accurate alignment between the headset and the carrier members the positioning of the carrier members may be adjusted by means of screw 11f. The device is connected to a suitable source of electrical potential (not shown) such as the common 120 volt alternating current receptacle. When it is desired to utilize the telephone 30, button 12d is depressed thereby moving the carrier members upwardly, raising the headset 31 from the base 32 of the telephone 30 and placing the telephone in a connected condition. Amplifiers 13 and 13′ are automatically connected at this time to the source of electrical potential by the closing of switch 19. All sounds received by headset receiver 31*a* are amplified by amplifiers 13 and projected from speaker 15, with the volume thereof being readily controllable through means of the associated volume control 13*a*. Any sound, such as the telephone user's voice, which is intended to be transmitted through the telephone, need only be directed to microphone 15*a* which transmits it through amplifier 13′ to the transmitter or mouthpiece 21*b* of the telephone headset. Variations in the loudness of the sound transmitted to the microphone 15*a* may be readily accommodated through use of the volume control 13*a* associated with the amplifier 13′, thus allowing the use of the device by a single person relatively near the telephone or by a large group disposed at relatively considerable distances from the telephone. To utilize telephone 30 without the manual depression of button 12*d*, the switch 16*a* may be used for actuating solenoid 16 to electromagnetically move the lever arm 12*a*. Thus, for example, if the telephone were placed on an upper shelf in a store or warehouse, ordering or instructional information could be transmitted or received by the clerk or workman simply by closing the remotely positioned switch 16*a* and thereby actuating the device and the telephone to receive and transmit the desired intelligence. Where it is desired to record the sounds being received and transmitted from and to telephone 30, any suitable recording equipment may be connected through the connecting means 17 to the respective amplifiers. Alternatively, a play-back system may be fed into the amplifiers thereby to transmit automatically desired intelligence from the telephone 30 to the party connected thereto through use of an automatic type of switch 16*a* responsive to the sound of the telephone 30 ring thus serving as a telephone answering system.

When it is desired to restore the telephone 30 to the disconnected condition, button 18*e* is depressed thereby releasing latch 18 and allowing lever arm 12*a* to pivot and carrier members 11 and 11′ to move to their lower position, with headset 31 being returned to the disconnected position. The amplifiers 13 and 13′ are disconnected automatically by the opening of the switch 19, as is the feed to the recording device through switch 19*a*.

If for any reason it is desired to remove the telephone 30 from the device, it may be merely lifted therefrom. Telephone handset 31 may be used in the conventional manner at any time, although telephone 30 is mounted on the device, by removing it from the base 32 and not depressing button 12*d*. Thus, where only intermittent use of the amplifying device is desired, the telephone 30 may be used in the normal conventional manner the remainder of the time.

While I have shown and described certain embodiments of my invention, it is to be understood that it is capable of many modifications. Changes, therefore, in the construction and arrangement may be made without departing from the spirit and scope of the invention as defined in the appended claims.

I claim:

1. A device for use with a telephone having a base, and sound transmitting and sound receiving elements carried by the base, comprising: a support adapted to carry the base; manually operable means for moving the elements relative to the base alternatively to place the telephone in a connected and a disconnected condition; means for amplifying sound transmitted to the transmitting elements and sound transmitted from the receiving elements; and means operably associated with each of said means for concurrently switching said amplifying means and actuating said elements moving means.

2. A device for use with a telephone having a base and a handset with sound transmitting and sound receiving elements and carried by the base, comprising: a support adapted to carry the base; at least one carrier member for movably positioning the handset relative to the base alternatively to place the telephone in a connected and a disconnected position; means for amplifying sound transmitted to the handset transmitting means and sound transmitted from the handset receiving means and having a connecting switch; at least one other electrical connecting means having a switch operably associated with the device; and a lever mechanism for concurrently operating said switches and positioning a carrier member.

3. A device for use with a telephone having a base and a handset with sound transmitting and sound receiving elements and carried by the base, comprising: a support adapted to carry the base; a plurality of vertically adjustable carrier members for movably positioning the handset relative to the base alternatively to place the telephone in a connected and a disconnected position; a microphone in a carrier member and means for amplifying sound transmitted from the handset transmitting element through said microphone; a speaker in a carrier member and means for amplifying sound to be transmitted through said speaker to the handset sound transmitting elements, each of said amplifying means having its own power transformer; switch means for electrically connecting said amplifier transformers to a source of electrical potential; and a lever mechanism for concurrently operating said switch means and positioning the carrier members.

4. A device for use with a telephone having a base and a handset with sound transmitting and sound receiving elements and carried by the base, comprising: a support adapted to carry the base; at least one carrier member for movably positioning the handset relative to the base alternatively to place the telephone in a connected and a disconnected position; means for amplifying sound transmitted to the handset transmitting means and sound transmitted from the handset receiving means and having a connecting switch; a lever mechanism for concurrently operating said connecting switch and positioning a carrier member; and a solenoid carried by said support for permitting remote actuation of said lever mechanism.

5. A device for use with a telephone having a base and a handset with sound transmitting and sound receiving elements and carried by the base, comprising: a support adapted to carry the base; at least one carrier member for movably positioning the handset relative to the base alternatively to place the telephone in a connected and a disconnected position; means for amplifying sound transmitted to the handset transmitting means and sound transmitted from the handset receiving means and having a connecting switch; a lever mechanism for concurrently operating said connecting switch and positioning a carrier member; and latch means for releasably maintaining said lever mechanism to place the telephone in a connected position.

6. A device for use with a telephone, comprising: manually operable actuating means for alternatively placing the telephone in operating and non-operating condition; a plurality of electrical switches operably associated with said actuating means; and means for amplifying sounds transmitted to and from the telephone, with at least one of said switches acting to control the amplifying means.

References Cited in the file of this patent

UNITED STATES PATENTS

| | | |
|---|---|---|
| 1,630,536 | Maurer | May 31, 1927 |
| 2,402,341 | Patterson | June 18, 1946 |
| 2,539,139 | Jordanoff | Jan. 23, 1951 |
| 2,543,761 | Chinte | Mar. 6, 1951 |
| 2,562,069 | Stein | July 24, 1951 |
| 2,615,098 | O'Brien | Oct. 21, 1952 |